United States Patent Office 3,313,362
Patented Apr. 11, 1967

3,313,362
METHOD OF, AND COMPOSITION FOR USE IN, GAS DRILLING
Ralph P. Schneider, Oklahoma City, Okla., assignor to Air Drilling Specialties Co., Oklahoma City, Okla., a corporation of Oklahoma
No Drawing. Filed Feb. 3, 1965, Ser. No. 430,206
20 Claims. (Cl. 175—71)

This invention relates to the gas drilling of wells using a foam producing composition conjunctively with a gas such as air or natural gas to constitute the drilling fluid employed. More specifically, in one of its aspects, the present invention relates to an improved additive composition to be injected into a gas when the latter material is used as the drilling fluid in the drilling of oil and gas wells.

Within the last fifteen years, the use of a gas as the drilling fluid employed in drilling oil and gas wells has greatly increased, and has been found to offer many advantages over the use of the older and more conventional mud type drilling fluids in many, though not all, drilling situations. In some instances, spectacular results in terms of improved drilling rates and reduction in pay zone contamination have been achieved using air or natural gas as the drilling fluid. On the other hand, some of the functions adequately achieved by conventional mud drilling techniques are not yielded to a suitable degree by gas drilling procedures, and under drilling conditions where these functions become of major importance, mud continues to be the preferred circulating medium employed. For example, where high subsurface pressures are encountered, gaseous drilling fluid lacks the ability of mud to control this pressure and prevent influx into the bore hole of the fluid content of traversed permeable zones. Other conditions may also dictate in favor of the use of mud, although a sacrifice in bit penetration rate will usually have to be tolerated if this choice is made.

Much work has been done since the advent of gas drilling to enlarge the scope of usefulness of this technique and to adapt the procedure to drilling situations which have previously tended to favor the use of mud. The developments from this work have taken two general directions. In one of these, the major benefits of both gas and mud drilling have been sought by using an aerated mud as the drilling fluid. In another approach, various additives, such as water and foaming agents, have been added to the circulated gas and have generally improved the cutting removing ability of the fluid. Despite substantial improvements in gas drilling resulting from the inclusion of such additives as foaming agents, the technique is still less suitable in many situations than mud drilling. For example, in drilling sloughing alluvial formations, the inability of the gas drilling procedure to provide a tough filter cake on the wall of the bore hole mitigates strongly in favor of the use of mud.

The present invention provides an improved gas drilling procedure which employs a novel additive composition in conjunction with a gaseous drilling fluid for drilling oil and gas wells and the like. Broadly described, the present invention comprises the premixing of a particulate bentonitic or montmorillonite type clay with water, a water soluble, natural gum and an anionic or nonionic type surfactant having good foam producing properties, and preferably selected from the group consisting of alkylaryl sulfonates, alkyl phenol ethoxylates, the salts of alkyl phenol ethoxy sulfates, the salts of alkyl ethoxy sulfates, and alkyl amine nonionic types of foaming agents. The nonionic types of surfactants are generally preferred to the anionic types. Cationic foaming agents are generally unsuitable for use in the invention.

The mixture of particulate clay, water and surface active agent is injected into the gaseous drilling fluid prior to the gas entering the drill string. After passing the bit, the mixture of the gaseous drilling fluid and the additive composition flows up the annulus of the well, contacting and lifting any water present. A dense, stable foam is formed which rises to the surface and is diverted into a blow line leading away from the well. The bit cuttings are removed from the well bore by the foam.

It is believed that the inclusion of bentonitic (montmorillonite) type clay particles in the premixed additive composition is novel, although the usefulness of this mineral in conventional drilling muds has, of course, long been recognized. I have found that the clay particles can be suspended in the additive composition and circulated successful into the well in the gaseous drilling fluid. It has been further determined that the presence of the bentonite particles in the foam produced in the annulus as the air is circulated therein greatly alleviates certain problems which have previously characterized air or gas drilling in certain types of formations. Thus, in loose, unconsolidated formations, sloughing of the formation into the bore hole is greatly reduced, and hole enlargement is prevented so that gauge diameter can be maintained and the need for cementing obviated. The clay particles form a filter cake on the walls of the well bore which seals off water bearing strata and thereby reduces problems of water encroachment. Other advantages also accrue from the use of the bentonite containing aqueous additive composition and will be subsequently mentioned herein.

The amounts of clay, gum, foaming or surface active agent and water employed may vary over fairly wide ranges. In general, from about 0.1 weight percent to about 10 weight percent of the bentonite, from about 0.01 weight percent to about 10 weight percent of the surface active agent and from about 0.005 weight percent to about 2 weight percent of the water soluble natural gum are employed, with the balance of the composition being water. The preferable procedure for preparing the additive is to initially intimately mix the clay, gum and water; then add the foaming agent to the mixture.

In gas drilling operations, such as, for example, drilling using air as the drilling fluid, air may be delivered by suitable compressor equipment to the well at the rate of from 2,000 to 7,000 c.f.m., or in any event, at a rate sufficient to provide a constant circulating pressure of from 20 to 200 p.s.i. The velocity of movement upwardly of the air in the well bore annulus should be from about 500 to about 5,000 feet per minute as required to provide adequate removal of the cuttings. The additive composition is continuously injected into the circulated air at a rate of from 15 to 90 barrels per hour (or roughly, from 1 barrel of additive for each 1,500 to 100,000 cubic feet of circulated air).

From the foregoing description of the invention, it will be perceived that it is a major object of the present invention to provide an improved gas drilling procedure which can be more beneficially employed in some types of drilling than either gas drilling as previously practiced, or drilling using mud as the circulating medium.

An additional object of the present invention is to provide a novel additive composition for injection into the gas stream being used in a gas drilling operation.

Another, and more specific, object of the invention is to provide an air drilling procedure which can be used in extending well bores through loose, alluvial type formations without the occurrence of sloughing to a detrimental degree.

An additional object of the invention is to provide an additive composition for use in gas drilling which permits a stable foam to be formed suitable for lifting cuttings from the well bore.

A further object of the present invention is to provide an air drilling procedure through the use of which, a filter cake may be formed on the well bore simultaneously with the circulation of a predominantly gaseous drilling fluid in the well bore.

An additional object of the present invention is to provide a gas drilling procedure which permits the gauge of the bore hole to be maintained and the requirements for cementing to be reduced or obviated.

In addition to the foregoing described objects and advantages, other objects and meritorious features of the present invention will become apparent as the following detailed description of the invention is considered.

The materials employed in the additive composition of the invention will first be considered. The clay can be substantially any of the bentonitic group which are customarily used in drilling mud technology. These clays consist predominantly of one or more montmorillonite type minerals which include montmorillonite, beidellite, nontronite, hectotite and saponite. The Wyoming type bentonites are preferred. The bentonitic clays are characterized by colloidal, thixotropic and wall-building properties which render them attractive to the mud chemist, and which impart some of the properties desired to the gas drilling additive composition of the present invention. As defined by their mud-making properties, the bentonitic clays most useful in the invention yield at least 60 barrels and preferably at least 90 barrels of mud having a viscosity of 15 centipoises per ton of clay. Though they are less preferred clay types for use in the invention, the so-called sub-bentonite or meta-bentonite clays can also be used and are generally characterized in yielding from 50 to 60 barrels of 15 centipoise mud per ton of clay. The amount of the particulate clay used in the additive composition of the invention can, as previously indicated, vary over a wide range of from about 0.1 weight percent to about 10 weight percent. The amount of the clay actually used will depend upon the conditions of drilling encountered, and it may be desirable to alter the amount of clay included in the composition as the types of formations encountered by the bore hole change. In general, within the broad range specified, an amount of the clay between 2 percent by weight and 5 percent by weight will usually be adequate and will preferably be used.

The water soluble natural gums which can be used in the invention can be substantially any of the gums occurring naturally as a product of plant life and having a high degree of water solubility. Stated differently, the gum materials should be true gum as distinct from the resins which are water insoluble materials. The gums may be generally defined as uncrystallizable, naturally occurring substances belonging to the carbohydrate class of compounds and having an acid nucleus to which are coupled various sugar molecules.

Those gums which have the characteristic of imparting the lowest fluid loss properties to water base drilling mud are preferably used in the present invention. Among other gums which may be employed are karaya, ghatti, tragacanth and guar gum. The preferred material for use in the invention is guar gum, although the ghatti and tragacanth gums also perform superiorly to other gums. Guar gum, which is the preferred gum material for use in the invention, can be obtained commercially under the trade name Low-Loss from the Stein-Hall Company of New York, New York.

The function of the gum in the additive of the present invention appears to be primarily that of improving the suspending power of the foam which is produced in the annulus of the well and to help to stabilize the foam. The amount of the gum employed can range from 0.01 weight percent to about 2 weight percent when the additive composition of the invention contains little or no alcohol as hereinafter described. If small to relatively large amounts of alcohol are added to the water, however, the amount of gum utilized in the composition can be increased up to about 5 percent. Within the described broad range over which the gum may be utilized in the additive composition, in almost all uses it will be preferable to use from about 0.1 weight percent to about 1 weight percent of the gum.

Several types of surfactant or foaming agent materials can be used in the practice of the invention. Broadly, these are the water soluble anionic and nonionic types. The cationic surfactants are strongly adsorbed on bit cuttings and can become completely inactive in the presence of pulverized solids. They are therefore not used in the additive composition of the present invention. As previously indicated, suitable types of foaming agents for use in the invention include, but are not limited to, alkyl aryl sulfonates, alkyl phenol ethoxylates, alkyl phenol ethoxy sulfate salts, alkyl ethoxy sulfate salts, and alkyl amine nonionic types of foaming agents. In all cases, surface active agents in which the alkyl groups contain from 10 to 16 carbon atoms are preferred. Aliphatic sulfonates, such as sodium lauryl sulfonate, can also be used, but are generally not as suitable as the other types which are described. When surfactants containing ethylene oxide groups are used, the number of this group present is from 6 to 20 moles, and preferably from 9 to 15 moles.

The most preferred type of foaming agents employed in the invention are the nonionic amides of fatty acids containing from 6 to 16 carbon atoms, and particularly caprylamide. The latter material is sold under the trade name Alrosol C by the Geigy Industrial Chemicals Company of Yonkers, New York. Foams produced by the latter material are only slightly affected by pH changes, and the foaming agent maintains its effectiveness in high concentrations of electrolyte.

The amount of foaming agents used in the additive composition can be varied over a range of from about 0.01 weight percent to about 20 weight percent. In most instances, an amount of from about 0.01 weight percent to about 10 weight percent of the preferred foaming agents will provide a foam in the well bore annulus of the desired quality and quantity. In general, of course, for economic reasons, the smallest amount of foaming agent which can be employed to produce sufficient foam to float the bit cuttings from the well bore, and remove any water which may enter the well bore from water bearing formations is utilized.

The water used in preparing the additive is preferably soft water containing a relatively low mineral content. Hard water can also be used, however, by adding from about 0.1 weight percent to about 3 weight percent soda ash (anhydrous sodium carbonate), or some other suitable type of water softening agent, to the mixture. The phosphate water softeners are suitable, as are other types of alkali metal carbonates than soda ash. In summary, substantially any type of water which is readily available at the well site may be utilized for preparing the additive of the present invention, although where it is available, soft water is preferable to permit reduction in treating cost.

It should be pointed out that in addition to the foregoing described constituents of the gas drilling additive composition, certain other non-essential constituents can also be used as modifiers in the additive, including small amounts of materials now used in conventional mud drilling for imparting certain desired properties to the drilling fluid. Thus, small amounts of carboxymethylcellulose may be added to the composition for viscosity adjustment purposes, and various polyacrylates can also be employed for fluid-loss reducing purposes. Tannins, lignins, quebracho and varous starches can also be added to the composition to yield certain desirable modifications in the physical and chemical properties thereof to customize the composition to a particular drilling environment.

In preparing the aqueous composition for injection into the gas being circulated into the well, all of the ingredients of the composition are preferably intimately and evenly mixed with the aqueous medium before the introduction of the foaming agent to the mixture. This can be done with any suitable low speed blending or mixing device which can disperse the clay particles in finely divided form throughout the suspension. After adding the foaming agent to the mixture, it is preferable to permit the mixture to stand quiescently for from five to thirty minutes prior to injection into the gaseous drilling fluid, although the inclusion of this quiescent period in the procedure is not required.

At this point in the description of the invention, it is believed that the understanding of the invention can be enhanced, and a better appreciation of the mechanism underlying its effectiveness can be gained, by referring to a test of the composition undertaken in the laboratory prior to field testing.

12.5 grams of Wyoming bentonite (90 barrels per ton of 15 centipoise mud minimum yield) were mixed with 0.5 gram of soda ash, 0.3 gram of guar gum and 350 grams of distilled water using a No. 30 Hamilton Beach mixer for a period of forty-five minutes at low mixer speed. Within thirty minutes following the mixing, about 100 milliliters of the aqueous mixture was placed in a 1,000 milliliter tall form beaker, and 0.5 milliliter of caprylamide foaming agent was added to the mixture with a hypodermic needle. The contents of the beaker were then agitated with the Hamilton Beach mixer at low speed for sixty seconds.

The foam produced by the stirring was then transferred within one minute to a 500 milliliter graduate, and reached a height exceeding 400 milliliters in the graduate. The contents of the graduate were then permitted to stand quiescently for a period of two hours, after which time less than 9 milliliters of the liquid had precipitated out, and substantially all of the bentonite remained suspended in the foam.

As previously indicated herein, the additive composition of the invention is injected into a gaseous drilling fluid being circuated into the well at a rate of from 2,000 to 7,000 c.f.m. and the rate of injection of the composition is preferably from about 15 to about 90 barrels of the composition per hour. The amount of the composition which is included in the circulated air will depend, of course, upon the conditions prevailing in the well bore and may range from very little of the composition to continuous injection of a substantial amount of the composition where sloughing and water invasion of the well bore are problems of major magnitude during the drilling. In other words, it should be understood that the method of the invention contemplates the injection of the additive composition in intermittent slugs, as well as the continuous injection of the composition.

As exemplary of the manner in which the composition has been utilized for improving the effectiveness of an actual drilling operation, the following examples are submitted.

*Example I*

A 64-inch hole was drilled through alluvial volcanic strata from a depth of 86 feet to a depth of 1,017 feet. 5%16 inch drill pipe was employed. During the drilling operation, eight air compressors were utilized to circulate 64,000 c.f.m. of air into the hole while injecting the additive composition of the present invention into the air circulating system at a rate varying from 35 barrels per hour to 75 barrels per hour. The average rate of injection of the composition over the total period of drilling (100 hours) was 55 barrels per hour.

The composition employed included 4.0 percent by weight bentonite particles, 0.85 percent by weight soda ash, 0.9 percent by weight guar gum, 0.7 percent by weight caprylamide with the balance being water. The circulating pressure being maintained constantly during the drilling operation varied from 200 p.s.i. to 240 p.s.i. with approximately 220 p.s.i. being the average circulating pressure. The average bit weight during the total period of drilling was about 5,000 pounds and the rotary table r.p.m. employed was 65.

The average penetration rate realized during the course of the drilling was 9.37 feet per hour. Continuous returns were quickly established during all phases of the drilling, and it was found that the addition of the aqueous composition to the air circulated in the well functioned to reduce particle slip velocity in the annulus while increasing the lifting capacity of the air stream for maximum hole cleaning effectiveness. At the site where the well was drilled, problems had previously been encountered in drilling large diameter holes, both in attempts to use the gaseous drilling fluid, as well as in employment of a mud type circulating medium. The primary problems had previously been sloughing of the traversed formations, lost circulation and enlarged hole sizes. The most successful method of drilling the alluvial volcanic formation which had previously been tried was that of injecting aqueous solutions of surface active agents into air circulated into the well so as to create a piston type action in the annulus of the well. This method, which is known in the air drilling art as slug drilling, usually increased the circulating pressure of the air drilling system by about 200 percent. As a result of such elevated pressure, the walls of the unconsolidated volcanic formations underwent fracturing, and erosion and sloughing of the formations were accelerated. The injection of the composition of the present invention retained all of the advantages previously realized by slug drilling, but additionally effected a substantial reduction in the constant circulating pressure required during drilling with the result that less sloughing occurred, and the diameter of the hole produced remained more nearly the gauge diameter.

*Example II*

In another drilling operation involving transversal of the alluvial volcanic strata described in the preceding example, a 64-inch diameter hole was drilled from 799 feet to a depth of 1490 feet. In this drilling operation, the total rotating time of the bit was 81 hours, and an average rotary table speed was 65 r.p.m. Air was circulated through the drill string and annulus at an average rate of 4800 c.f.m. by six compressors. The additive composition of the invention, made up as described in the preceding example, was injected into the air stream at a rate of 90 barrels per hour. A double acting piston pump having a minimum injection rate capacity of 90 barrels per hour was used for injecting the composition into the air stream which accounts for the higher rate of injection employed in the drilling described in the preceding example. A total volume of 7,290 barrels of the composition were injected and the average circulation pressure employed was 150 p.s.i. Under these conditions, the average penetration rate attained while maintaining an average bit weight of 10,000 pounds was 8.69 feet per hour. Continuous returns were maintained during the entire drilling operation.

The particle slip velocity occurring in the annulus when the composition of the invention was included in the circulated air was substantially reduced, and the lifting capacity of the air stream was increased to improve the extent to which the hole was cleaned by the circulated fluid. Water separation from the foam was substantially reduced, and a tough filter cake was built on the wall of the bore hole, thereby reducing hole erosion. No significant enlargement of the hole diameter over gauge occurred during the drilling.

From the foregoing description of the invention, it can be perceived that the present invention provides a substantial improvement in the effectiveness with which air or gas drilling may be employed in loose or unconsolidated formations. Sloughing of the bore hole is effectively reduced, and the ability to drill nearly gauge holes through such formations is realized. The method is economical and easily practiced and is characterized by many of the advantages of both gas drilling and mud drilling.

Although various specific embodiments of the invention have been hereinbefore described in detail, and certain materials and process parameters have been identified as exemplary of the practice of the invention, it will be appreciated that the primary purpose of the disclosure has been to provide to one skilled in the art, an indication of how the invention is to be practiced. It is to be expected that certain equivalents to the specific examples herein set forth will exist and will be readily apparent to those trained in drilling technology. All such equivalents are therefore intended to be circumscribed by the spirit and scope of this invention except as the same may be necessarily limited by the appended claims as broadly construed.

I claim:

1. The method of drilling a well using a gaseous drilling fluid to remove bit cuttings from the well bore comprising:
   circulating a gaseous drilling fluid continuously into the well bore during the drilling of the well; and
   injecting into said gaseous drilling fluid in an amount of 1 barrel of additive composition for each 1,500 to 100,000 cubic feet of gaseous drilling fluid circulated into the well, an aqueous additive composition comprising:
   (a) water;
   (b) from about 0.1 weight percent to about 10 weight percent of a bentonitic clay;
   (c) from about 0.005 weight percent to about 2 weight percent of a water soluble natural gum; and
   (d) from about 0.01 weight percent to about 20 weight percent of a foaming agent other than a cationic foaming agent and selected from the group consisting of alkyl aryl sulfonates, alkyl phenol ethoxylates, alkyl phenol ethoxy salts, alkyl ethoxy sulfate salts and alkyl amines.

2. The method claimed in claim 1 wherein the foaming agent employed is a nonionic amide of a fatty acid containing from 6 to 16 carbon atoms.

3. The method claimed in claim 1 wherein said natural gum is guar gum.

4. The method claimed in claim 1 wherein said bentonitic clay is a clay, each ton of which will yield at least 60 barrels of a drilling mud having a viscosity of 15 centipoises when mixed with water.

5. The method claimed in claim 1 wherein 1 barrel of said additive composition is injected into each 30,000 to 70,000 cubic feet of gaseous drilling fluid circulated into said well.

6. The method claimed in claim 1 wherein the gaseous drilling fluid is circulated into the well bore at a rate sufficient to provide an upward velocity of the gaseous drilling fluid into the well bore annulus of from 500 to 5,000 feet per minute.

7. The method claimed in claim 1 wherein said additive composition is further characterized as including from about 0.1 weight percent to about 3 weight percent of sodium carbonate.

8. The method claimed in claim 1 wherein said additive composition is prepared by
   (a) intimately mixing the water, clay, and natural water soluble gum with each other to provide a uniform dispersion of the solid materials in the water; then
   (b) mixing the foaming agent with said dispersion.

9. The method claimed in claim 8 and further characterized to include the step of permitting said additive composition to stand quiescently for a period of from 5 minutes to 30 minutes after mixing the foaming agent with the dispersion and before injecting the additive composition into the gaseous drilling fluid.

10. The method claimed in claim 2 wherein the amount of foaming agent used in said additive composition is from about 0.01 weight percent to about 10 weight percent of the composition.

11. The method claimed in claim 3 wherein the amount of guar gum used in said additive composition is from about 0.1 weight percent to about 1 weight percent of the composition.

12. The method claimed in claim 2 wherein the foaming agent employed in said additive composition is capryl amide.

13. The method claimed in claim 4 wherein the amount of said bentonitic clay used in said additive composition is from about 2 weight percent to about 5 weight percent of the composition.

14. An additive composition for injection into a gaseous well drilling fluid comprising:
   (a) water;
   (b) from about 0.1 weight percent to about 10 weight percent of a bentonitic clay having the capability of producing, when 1 ton of the clay is mixed with water, at least 50 barrels of mud having a viscosity of 15 centipoises;
   (c) from about 0.005 weight percent to about 2 weight percent of a water soluble, uncrystallizable natural gum selected from the group consisting of karaya, ghatti, tragacanth and guar gums; and
   (d) from about 0.01 weight percent to about 20 weight percent of a foaming agent other than a cationic foaming agent and selected from the group consisting of alkyl aryl sulfonates, alkyl phenol ethoxylates, alkyl phenol ethoxy salts, alkyl ethoxy sulfate salts and alkyl amines.

15. An additive composition as defined in claim 14 wherein said foaming agent is a nonionic amide of a fatty acid containing from 6 to 16 carbon atoms.

16. The additive composition defined in claim 14 wherein the amount of natural, water soluble gum included in said composition is from about 0.1 weight percent to about 1 weight percent and the gum used is guar gum.

17. The additive composition defined in claim 14 wherein the clay used in said composition is a Wyoming bentonite capable of yielding at least 90 barrels of 15 centipoise mud per ton of the bentonite.

18. The additive composition defined in claim 14 wherein said composition is further characterized in including from about 0.1 weight percent to about 3 weight percent of a water softening material.

19. The additive composition defined in claim 14 wherein the amount of said foaming agent in said additive composition is from about 0.01 weight percent to about 10 weight percent and said foaming agent is capryl amide.

20. The additive composition defined in claim 17 wherein the amount of clay used in said composition is from about 2 weight percent to about 5 weight percent.

References Cited by the Examiner

UNITED STATES PATENTS

| | | | |
|---|---|---|---|
| 2,729,426 | 1/1956 | Smith | 175—68 |
| 2,738,163 | 3/1956 | Shields | 175—68 |
| 2,764,242 | 9/1956 | Rohrback et al. | 166—1 |
| 3,040,821 | 6/1962 | Widess | 175—70 X |
| 3,120,266 | 2/1964 | Martin et al. | 175—71 X |
| 3,136,360 | 6/1964 | Ramos et al. | 166—12 |
| 3,220,947 | 11/1965 | Sawyer | 252—8.5 |
| 3,240,280 | 3/1966 | Stratton et al. | 175—71 |

CHARLES E. O'CONNELL, *Primary Examiner.*

R. E. FAVREAU, *Assistant Examiner.*